(12) United States Patent
Hall et al.

(10) Patent No.: US 7,738,551 B2
(45) Date of Patent: Jun. 15, 2010

(54) SYSTEM AND METHOD FOR PROCESSING A HIGH DEFINITION TELEVISION (HDTV) IMAGE

(75) Inventors: Barbara A. Hall, Endwell, NY (US); Agnes Y. Ngai, Endwell, NY (US); Robert L. Woodard, Newark Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 2227 days.

(21) Appl. No.: 10/100,394

(22) Filed: Mar. 18, 2002

(65) Prior Publication Data

US 2003/0174768 A1   Sep. 18, 2003

(51) Int. Cl.
*H04N 7/12* (2006.01)
*H04N 7/50* (2006.01)

(52) U.S. Cl. ............................ 375/240.01; 348/446

(58) Field of Classification Search .......... 375/240.1, 375/240.16, 240.28, 240.14, 240.03, 240.05, 375/240.12, 240.01, 240.25, 240.18, 240.24; 348/433, 432, 429, 427, 390, 446, 558, 469, 348/584, 699; 341/51, 50, 65, 67; 382/234, 382/236, 238, 243
See application file for complete search history.

(56) References Cited

U.S. PATENT DOCUMENTS

| | | | |
|---|---|---|---|
| 4,523,220 A | | 6/1985 | Adelsen et al. |
| 4,963,965 A | | 10/1990 | Haghiri et al. |
| 4,985,767 A | | 1/1991 | Haghiri et al. |
| 5,111,292 A | | 5/1992 | Kuriacose et al. |
| 5,115,309 A | * | 5/1992 | Hang .................... 348/388.1 |
| 5,138,447 A | * | 8/1992 | Shen et al. ............ 375/240.12 |
| 5,187,575 A | * | 2/1993 | Lim ...................... 348/558 |
| 5,291,289 A | | 3/1994 | Hulyalkar et al. |
| 5,325,199 A | * | 6/1994 | Childs .................. 348/459 |
| 5,398,315 A | * | 3/1995 | Johnson et al. ........ 604/323 |
| 5,410,355 A | | 4/1995 | Kolczynski |
| 5,428,403 A | * | 6/1995 | Andrew et al. ........ 348/699 |
| 5,508,746 A | * | 4/1996 | Lim ...................... 375/240.25 |
| 5,510,842 A | | 4/1996 | Phillips et al. |
| 5,583,889 A | | 12/1996 | Citta et al. |
| 5,640,210 A | | 6/1997 | Knee et al. |
| 5,675,424 A | | 10/1997 | Park |
| 5,856,847 A | * | 1/1999 | Knee et al. ............. 348/390.1 |
| 5,991,341 A | | 11/1999 | Shin |
| 6,100,940 A | * | 8/2000 | Dieterich ............... 348/700 |

(Continued)

OTHER PUBLICATIONS

Feig, E. and Linzer, E., "Nonlinear Encoding for Image Data Transmission," IBM Technical Disclosure Bulletin, vol. 35, No. 1B, pp. 435-436, Jun. 1992.

(Continued)

*Primary Examiner*—Behrooz Senfi
(74) *Attorney, Agent, or Firm*—Ian MacKinnon; Hoffman Warnick LLC

(57) ABSTRACT

The present invention provides a system and method for processing a High Definition Television (HDTV) image. Specifically, the system and method of the present invention provides a plurality of programmable encoders connected in parallel and directly (i.e., gluelessly) attached to a HDTV video source. The system and method of the present invention allows a full HDTV image to be received by each encoder at 74.25 MHz directly from the HDTV video source. Based on programming, each encoder will process only a portion of the full image.

19 Claims, 4 Drawing Sheets

U.S. PATENT DOCUMENTS

| | | | |
|---|---|---|---|
| 6,108,046 A * | 8/2000 | Wu et al. ..................... 348/558 |
| 6,122,010 A | 9/2000 | Emelko |
| 6,184,921 B1 | 2/2001 | Limberg |
| 6,185,255 B1 | 2/2001 | Twitchell et al. |
| 6,222,891 B1 | 4/2001 | Liu et al. |
| 6,275,536 B1 * | 8/2001 | Chen et al. ............. 375/240.25 |
| 6,356,589 B1 * | 3/2002 | Gebler et al. ............ 375/240.1 |
| 6,501,861 B1 * | 12/2002 | Cho et al. .................... 382/243 |
| 6,621,870 B1 * | 9/2003 | Gordon et al. ......... 375/240.28 |
| 6,661,846 B1 * | 12/2003 | Ota ........................ 375/240.28 |
| 6,731,685 B1 * | 5/2004 | Liu et al. ............... 375/240.14 |
| 6,788,227 B2 * | 9/2004 | Hall et al. ...................... 341/51 |
| 7,072,393 B2 * | 7/2006 | Boice et al. ............ 375/240.01 |
| 2002/0131084 A1 * | 9/2002 | Andrew et al. ............. 358/1.16 |
| 2003/0210821 A1 * | 11/2003 | Yogeshwar et al. ......... 382/232 |

OTHER PUBLICATIONS

Nishitani, T., et al. "Video Signal Processor Configuration by Multi-processor Approach". IEEE Apr. 1986, vol. 1, pp. 797-800.

"Video signal processor configuration by multiprocessor approach" Speechand Signal Processing, IEE Apr. 1986, vol. 1. p. 797-800.

* cited by examiner

SYSTEM AND METHOD FOR PROCESSING A HIGH DEFINITION TELEVISION (HDTV) IMAGE

BACKGROUND OF THE INVENTION

1. Field of the Invention

The present invention generally relates to a system and method for processing a High Definition Television (HDTV) image. More particularly, the present invention provides a plurality of encoders connected in parallel and directly attached to a HDTV video source for processing a HDTV image.

2. Background Art

The advent of the High Definition Television (HDTV) standard, and the requirement to perform Moving Pictures Experts Group (MPEG) video compression on images in the HDTV format, has created significant video data processing demands on MPEG-2 encoder Application Specific Integrated Circuits (ASICs). Specifically, encoders that compress video data in Standard Definition (SD) format typically process 480 active video lines (i.e., out of a total of 525 lines per video frame) consisting of 720 active luminance and chrominance pixels (i.e., out of a total of 858) at a 13.5 MHz pixel clock rate for an input rate of 30 frames per second. Conversely, a MPEG-2 encoder must typically process incoming HDTV pixel data (e.g., one luminance and one chrominance pixel data byte) 5-6 times faster to yield the same input rate of 30 frames per second. That is, 1080 or 1088 active video lines (i.e., out of a total of 1125 lines per video frame) consisting of 1920 active luminance and chrominance pixels (i.e., out of a total of 2200) per line are scanned into the encoder at a pixel clock rate of 74.25 MHz.

With present technology, it is generally not feasible to for a single MPEG-2 encoder to process/compress HDTV images at full resolution (i.e., 5-6 times faster than for Standard Definition). It is therefore necessary to have a HDTV MPEG-2 video architecture that utilizes multiple encoders to process a single HDTV image at fill resolution. With such an architecture, an image must be split horizontally or vertically into multiple portions for processing by the encoders. In splitting the HDTV image, problems arise in that a large amount of logic and memory, external to the encoders, is required. Specifically, external logic must be provided to buffer and split the HDTV image into smaller portions. The external logic would then send a particular portion of the HDTV image to each of the encoders.

An additional problem often encountered is that many encoders can accept pixel data only at the Standard Definition pixel clock rate of 13.5 MHz. As indicated above, the HDTV pixel clock rate is approximately 74.25 MHz. Thus, the external logic may be forced to accept data at 74.25 MHz, but transmit the data to the encoders at 13.5 MHz. Providing this capability adds more complexity to the external control logic as well as significantly more external memory buffers. Accordingly, the requirement for system designers to include external splitter and control logic (collectively referred to as glue logic) significantly drives up the overall system cost and complexity.

In view of the foregoing, there exists a need for a system and method for processing a HDTV image. In addition, there exists a need for a system and method for directly attaching a plurality of video encoders to a HDTV video source such that external splitter and control logic is not required. In addition, there exists a need for the encoders to be programmable so that each encoder receives an entire HDTV image from the HDTV video source, but processes only a portion thereof.

SUMMARY OF THE INVENTION

The present invention provides a system and method for processing a HDTV image. Specifically, the present invention provides a plurality of video encoders connected in parallel and directly (e.g., gluelessly) attached to a HDTV video source. Each of the encoders receives an entire image from the HDTV video source but, through programming, processes only a portion thereof. This architecture obviates the need for splitter and control logic between the encoders and the HDTV video source. This also allows the encoders to receive the image at the HDTV rate of 74.25 MHz.

According to a first aspect of the present invention, a system for processing a High Definition Television (HDTV) image is provided. The system comprises: (1) a plurality of video encoders connected in parallel; (2) wherein each of the encoders receives an entire image from a HDTV video source; and (2) wherein each of the encoders is programable for processing only a portion of the entire image.

According to a second aspect of the present invention, a system for processing a High Definition Television (HDTV) image is provided. The system comprises: (1) a plurality of video encoders connected in parallel and directly attached to a HDTV video source; and (2) wherein each of the encoders receives an entire image from the HDTV video source, and wherein each of the encoders is programable for processing only a portion of the entire image.

According to a third aspect of the present invention, a method for processing a High Definition Television (HDTV) image is provided. The method comprises the steps of: (1) providing a plurality of video encoders connected in parallel and directly attached to a HDTV video source; and (2) programming each of the encoders to process only a portion of an entire image received from the HDTV video source.

Therefore, the present invention provides a system and method for processing a HDTV image.

BRIEF DESCRIPTION OF THE DRAWINGS

These and other features of this invention will be more readily understood from the following detailed description of the various aspects of the invention taken in conjunction with the accompanying drawings in which.

Figure 1:
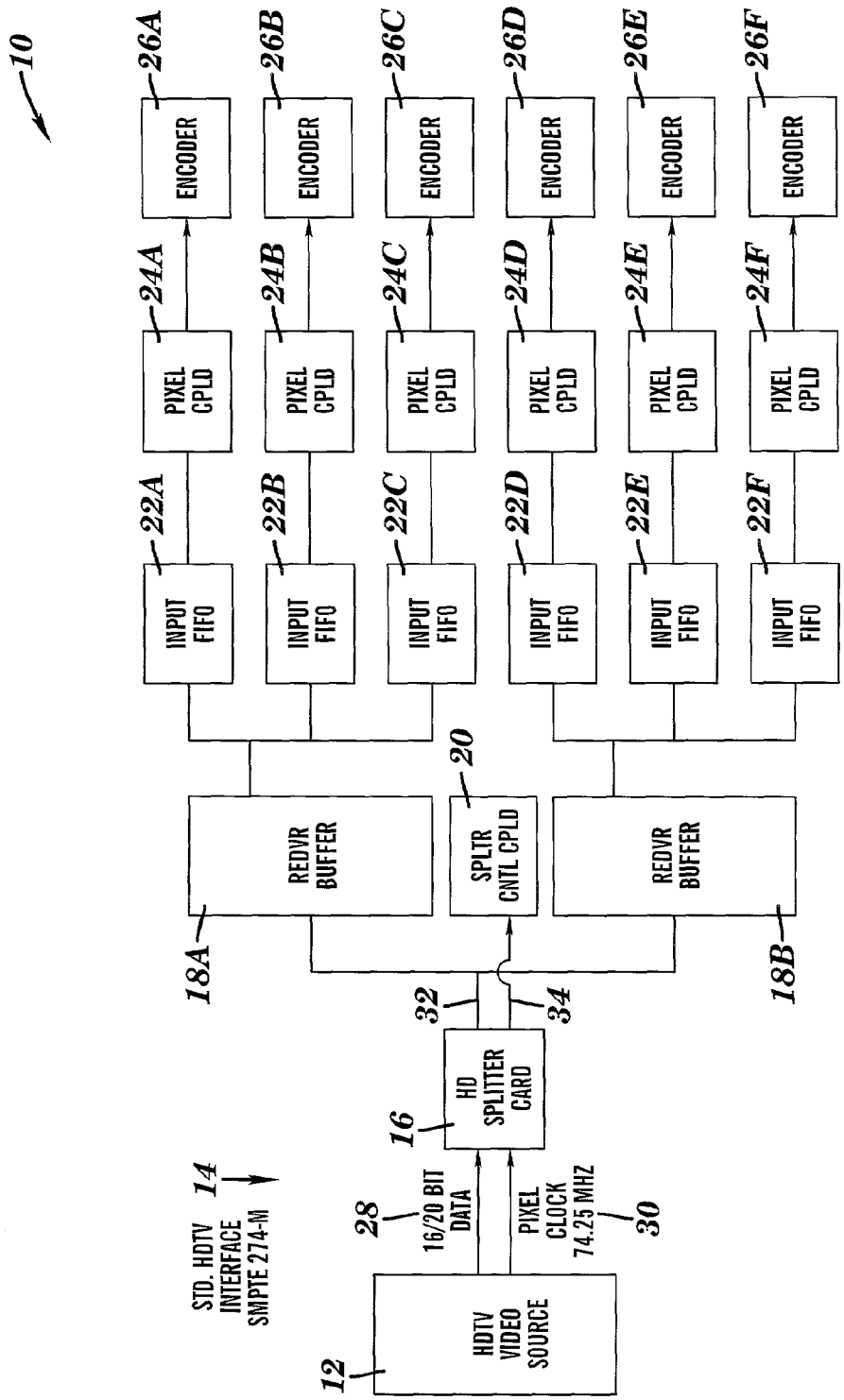
FIG. 1 depicts a related art architecture.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, the present invention provides a system and method for processing a High Definition Television (HDTV) image in which a plurality of encoders are directly/gluelessly attached to a HDTV video source. As indicated above, multiple MPEG-2 encoders are generally required to process a HDTV image because no single encoder can process the entire image. Moreover, most existing MPEG-2 encoders cannot receive HDTV data signals at the HDTV rate of 74.25 MHz. Rather, most encoders must receive the HDTV data signals at the Standard Definition (SD) rate of 13.5 MHz. Accordingly, existing architectures generally require complex splitter and control logic to be interposed between the encoders and the HDTV video source. The splitter logic will partition each HDTV image into portions, and feed each encoder with a single portion. The control logic will slow the HDTV data signals down to the SD rate of 13.5 MHz so that the encoders can accurately process the images therein. As indicated above, however, such architectures are both costly and complex.

Referring now to FIG. 1, a related art architecture 10 is shown. As depicted, architecture 10 includes encoders 26A-F and HDTV video source 12. In order for a HDTV image within data signal 28 from HDTV video source 12 to be processed by encoders 26A-F, it must first be processed by buffers 18A-B, input First In—First Outs (FIFOs) 22A-F and pixel CMOS Programmable Logic Devices (CPLDs) 24A-F. Specifically, as shown, data signal 28 and pixel clock signal 30 (collectively referred to as HDTV interface 14) are received in HD splitter card 16 from HDTV video source 12. Splitter card 16 drives data signal 28 and pixel clock signal 30 to enable writing to input FIFOs 22A-F. To this extent, splitter card 16 outputs a thirty-two bit HDTV video data signal 32 to the appropriate input FIFO 22A-F (through buffers 18A-B) and a set of control signals 34 to splitter control CPLD 20. Specifically, splitter card 16 splits an incoming HDTV video data signal 28 (e.g., having a HDTV image) into smaller individual pieces, and feeds an output HDTV video data signal 32 to buffers 18A-B. Buffer 18A re-drives video data signal 32 to input FIFOs 22A-C, while buffer 18B re-drives video data signal 32 to input FIFOs 22D-F.

Input FIFOs 22A-F are read sixteen bits at a time, and video data signal 32 is input to encoders 26A-F for compression. The reading of input FIFOs 22A-F can be driven by either splitter card 16 or by pixel CPLDs 24A-F (i.e., shown interposed between encoders 26A-F and input FIFOs 22A-F). Another function of pixel CPLDs 24A-F would be to extract the video synch from video data signal 32 and supply the synch to encoders 26A-F.

As shown in FIG. 1, several intervening pieces of "glue" logic (i.e., splitter 16, buffers 18A-B, splitter control CPLD 20, input FIFOs 22A-F and pixel CPLDs 24A-F) are required to process a HDTV data signal. Such logic ensures both that each encoder 26A-F receives only a portion of a HDTV image to be processed (e.g., compressed), and that the image portion is received at the SD clock rate of 13.5 MHz. For example, if an image from HDTV video source 12 has a size of 900 lines and a clock rate of 74.25 MHz, the logic shown in FIG. 1 will split the image into six distinct portions (i.e., one portion for each encoder 26A-F) that each have a size of approximately 150 lines. Each encoder 26A-F will then receive a different 150 line portion (assuming no overlap) at a clock rate of 13.5 MHz.

Figure 2:
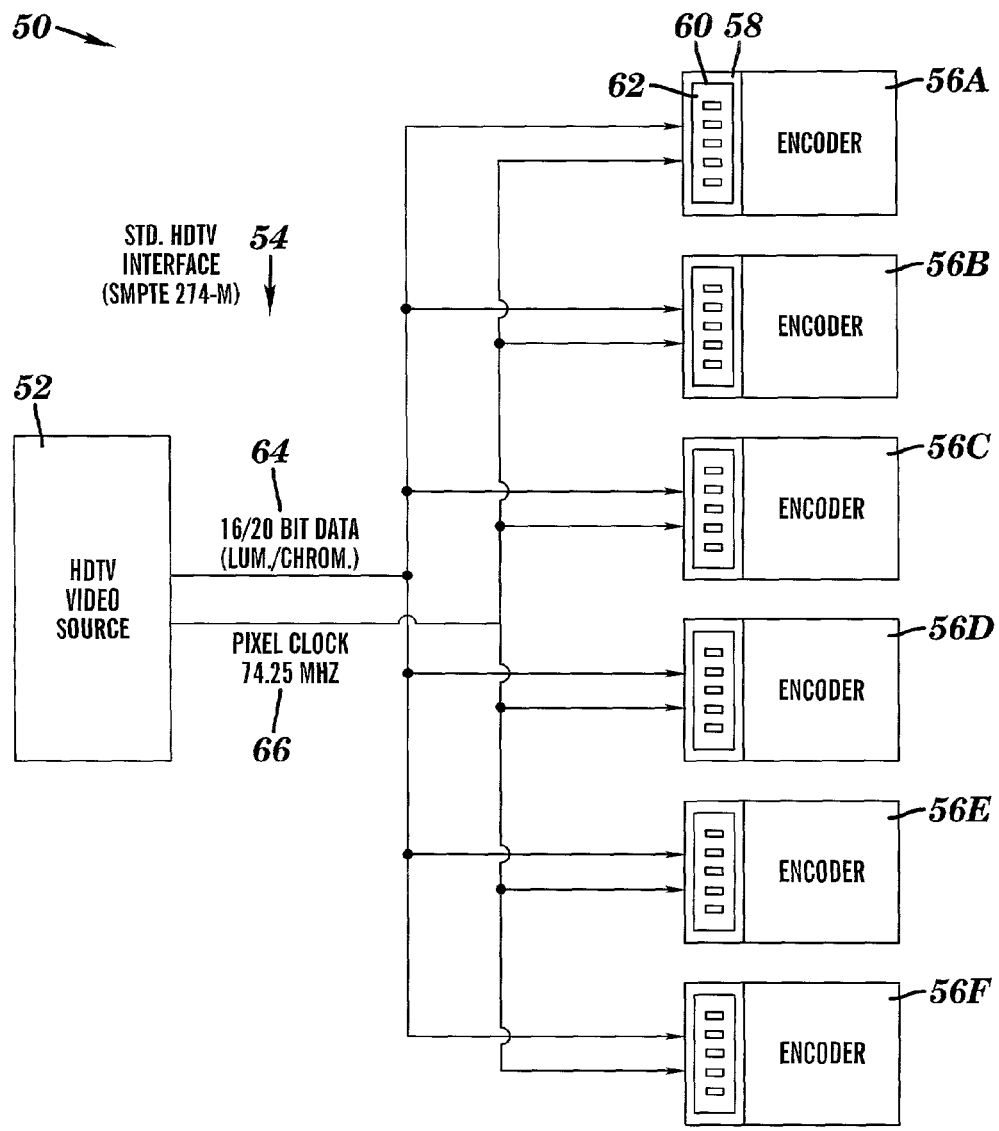
FIG. 2 depicts a plurality of encoders connected in parallel and directly attached to an HDTV video source, according to the present invention.

Referring now to FIG. 2, an exemplary architecture 50 according to the present invention is shown. The architecture shown in FIG. 2 allows encoders 56A-F to receive an entire HDTV image at the HDTV clock rate of 74.25 MHz. Thus, the need for intervening glue logic (e.g., splitter and control logic) is obviated.

As depicted, MPEG-2 encoders 56A-F are connected in parallel and are directly (e.g., gluelessly) attached to HDTV video source 52. Under the present invention, each encoder 56A-F receives HDTV video data signal 64 and pixel clock signal 66 (collectively referred to as Society of Moving Pictures and Television Engineers (SMPTE) 274-M HDTV interface 54) directly from HDTV video source 52. Thus, instead of receiving only a portion of a HDTV image (as in the related art), encoders 56A-F of the present invention will receive an entire HDTV image. As such, each encoder 56A-F will typically receive 30 frames per second of HDTV data (e.g., containing HDTV image(s)) consisting of 1080 or 1088 active video lines (i.e., out of a total of 1125 lines per video frame) having 1920 active luminance and chrominance pixels (i.e., out of a total of 2200) per line.

Although each encoder 56A-F will receive an entire HDTV image, no single encoder can process the entire image, as explained above. Thus, the processing must be divided among encoders 56A-F. Processing system 60 provides this functionality. Specifically, each encoder 56A-F includes a digital video input interface 58 that includes processing system 60, which comprises one or more programmable registers 62. In a typical embodiment, registers 62 are programmed with processing information such as: (1) a quantity of encoders 56A-F in the configuration; (2) a relative position of each encoder with respect to one another within the configuration; (3) whether a HDTV image is to be processed horizontally or vertically; (4) a quantity of pixels or lines that adjacent portions should overlap; and (5) an overall image size in pixels or lines based on the processing orientation. Thus, for the exemplary architecture 50 shown in FIG. 2, the five registers 62 of encoder 56A could be programmed as follows: (1) six; (2) first; (3) vertically; (4) 16 pixels; and (5) 1920 pixels. Once registers 62 have been programmed, internal micro-programming within encoders 56A-F is guided by the programmed information, resulting in internal register settings that are tailored for each encoder 56A-F. The end result is that each encoder 56A-F processes a different section of the full HDTV image. It should be understood that separate registers have been shown for exemplary purposes only, and other variations may be implemented.

Figure 3:
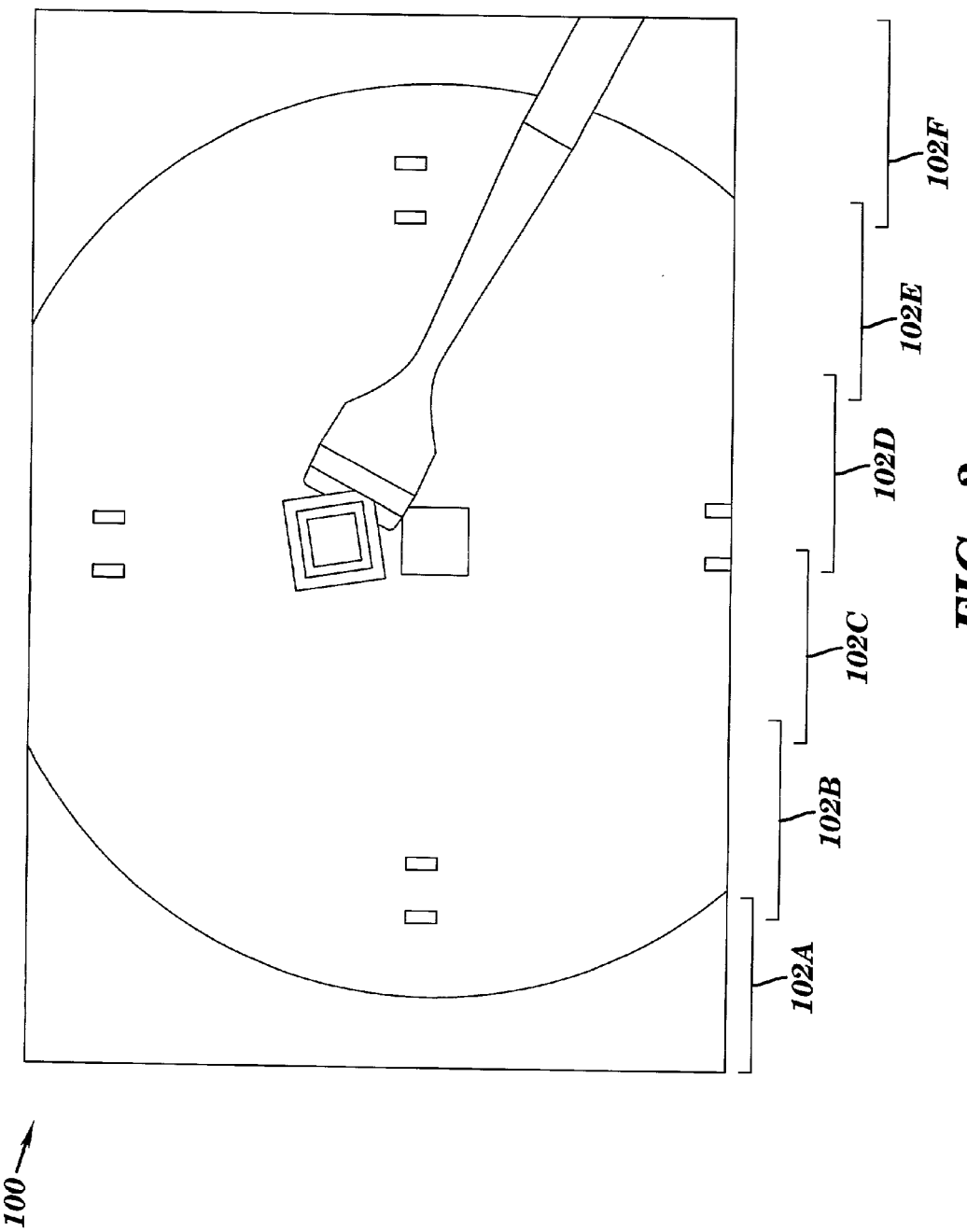
FIG. 3 depicts an exemplary image being processed, according to the present invention.

Referring now to FIG. 3, an exemplary HDTV image 100 processed under the present invention is shown. Image 100 is intended to be representative of a 1920 pixel HDTV image. If registers 62 are programmed for a vertical processing orientation and a 16 pixel overlap, each encoder 56A-F will have the following programming:

| Encoder | Encoder Quantity | Relative Position | Processing Orientation | Overlap (pixels) | Image Size (pixels) |
| --- | --- | --- | --- | --- | --- |
| 56A | 6 | $1^{ST}$ | Vertical | 16 | 1920 |
| 56B | 6 | $2^{ND}$ | Vertical | 32 | 1920 |
| 56C | 6 | $3^{RD}$ | Vertical | 32 | 1920 |
| 56D | 6 | $4^{TH}$ | Vertical | 32 | 1920 |
| 56E | 6 | $5^{TH}$ | Vertical | 32 | 1920 |
| 56F | 6 | $6^{TH}$ | Vertical | 16 | 1920 |

In general, image 100 will be divided into six portions 102A-F (i.e., one portion for each encoder 56A-F). The portions are generally equal with the exception of any programmed overlap. Portion 102A will be processed by encoder 56A, while portions 102B-F will be processed by encoders 56B-F, respectively. As further shown in FIG. 3, portions 102A-F have been provided with overlap. Specifically, as indicated in the above table, an overlap of 16 pixel was programmed for encoders 56A and 56F, while an overlap of 32 pixels was programmed for encoders 56B-E. The overlap refers to the amount that an image portion will overlap with an adjacent image portion. For example, portion 102B is programmed for 32 pixels of overlap. Thus, portion 102B overlaps with portion 102A by 16 pixels and portion 102C by 16 pixels (for a total overlap of 32 pixels). Since portions 102A and 102F are on the edge of image 100, they will only overlap with one other portion (i.e., 102B and 102E, respectively). Accordingly, portions 102A and 102F have a total overlap of only 16 pixels. To this extent, the relative position of a particular encoder with respect to the other encoders (e.g., first, second, etc.) is important in determining overlap.

Overlap helps ensure that motion vector(s) based on "best matched" macro blocks from adjacent portions of HDTV image 100 can be generated (i.e., motion estimation overlap in HDTV image processing). It should be understood that overlap as described herein is optional, and that image processing could be provided with no overlap. In such a case, portions 102A-F would be contiguous. Moreover, it should be appreciated that image 100 is described herein as being processed vertically for exemplary purposes only, and that the same concepts could be applied to the horizontal processing of image 100.

Figure 4:
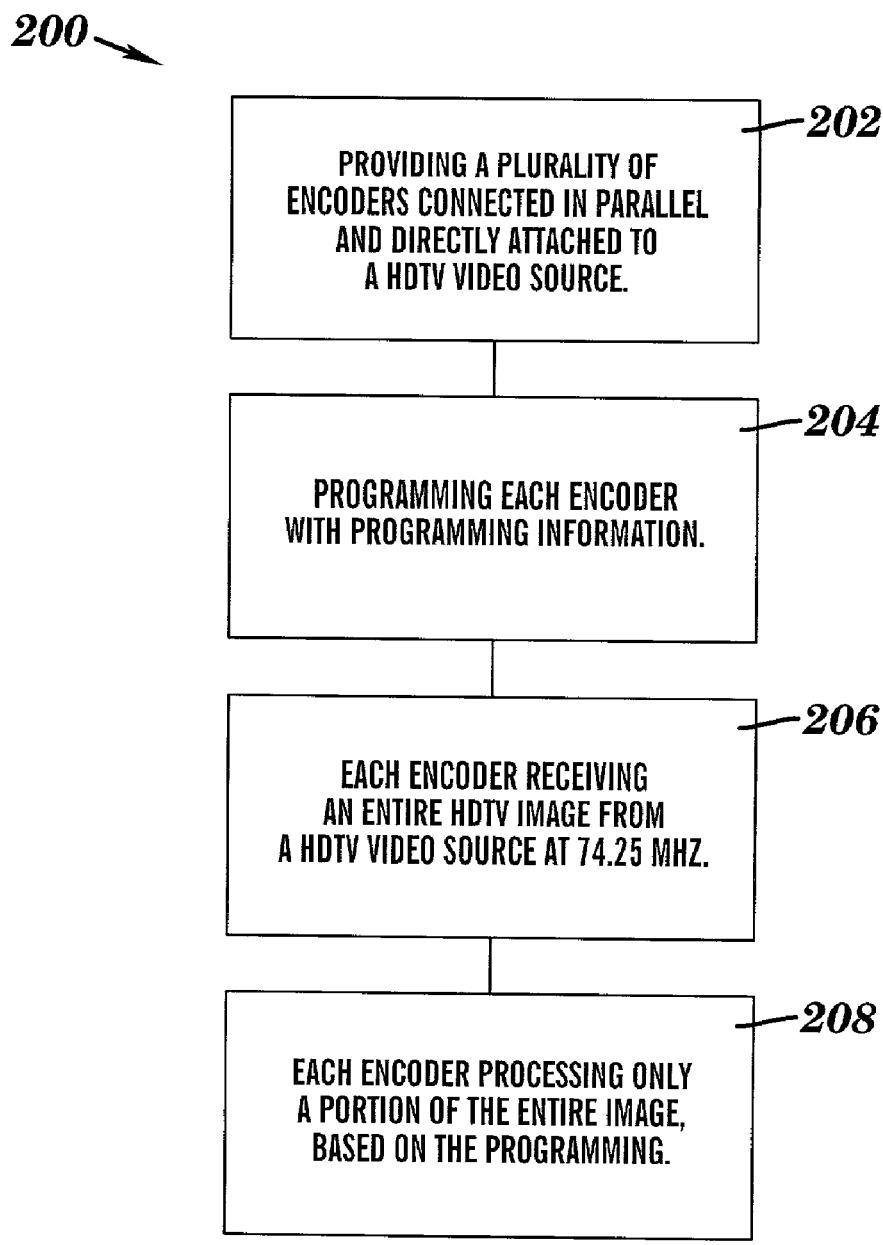
FIG. 4 depicts an exemplary method flow diagram, according to the present invention.

Referring now to FIG. 4, an exemplary method flow diagram 200 according to the present invention is shown. First step 202 is to provide a plurality of encoders connected in parallel and directly attached to a HDTV video source. Next step 204 is to program each encoder 56A-F (i.e., as described above). Once programmed, an entire HDTV image is received by each encoder 56A-F from HDTV video source 52 at 74.25 MHz in step 206. Based on the programming, each encoder 56A-F will process only a portion of the entire image 208. As described above, the portion to be processed by a particular encoder depends on the quantity of encoders in the configuration, the relative position of the particular encoder, any desired overlap, the total image size, and whether the image is processed horizontally or vertically.

It is understood that the present invention can be realized in hardware, software, or a combination of hardware and software. Specifically, it should be appreciated that encoders 56A-F of the present invention can be programmed via a computer-based system (not shown). A typical combination of hardware and software could be a general purpose (computer) system with a computer program that, when loaded and executed, controls the computer system such that it carries out the methods described herein. Alternatively, a specific use computer system, containing specialized hardware for carrying out one or more of the functional tasks of the invention could be utilized. The present invention can also be embedded in a computer program product, which comprises all the features enabling the implementation of the methods described herein, and which—when loaded in a (computer) system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A system for processing a High Definition Television (HDTV) image, comprising:
   a plurality of video encoders connected in parallel;
   wherein each of the encoders receives an entire image from a HDTV video source; and
   wherein each of the encoders processes only a portion of the entire image.

2. The system of claim 1, wherein the encoders are directly attached to the HDTV video source.

3. The system of claim 1, wherein the encoders are MPEG-2 encoders.

4. The system of claim 1, wherein each of the encoders comprises:
   a digital video input interface for receiving the HDTV image directly from the HDTV video source; and
   a programming system for programming each of the encoders to determine the portion of the entire image to be processed thereby.

5. The system of claim 4, wherein the programming system comprises:
   a quantity system for designating an encoder quantity;
   a position system for designating a relative encoder position;
   a processing system for designating a processing orientation;
   an overlap system for designating an overlap between image portions; and
   a size system for designating an image size.

6. The system of claim 4, wherein the programming system comprises a plurality of programmable registers.

7. The system of claim 1, wherein the encoders receive the image at a pixel clock rate of approximately 74.25 MHz.

8. The system of claim 1, wherein each of the encoders receives a same entire image from the HDTV video source.

9. A system for processing a High Definition Television (HDTV) image, comprising:
   a plurality of video encoders connected in parallel and directly attached to a HDTV video source; and
   wherein each of the encoders receives an entire image from the HDTV video source, and wherein each of the encoders processes only a portion of the entire image.

10. The system of claim 9, wherein each of the encoders comprises:
    a digital video input interface for receiving the HDTV image directly from the HDTV video source; and
    a programming system for programming each of the encoders to determine the portion of the entire image to be processed thereby.

11. The system of claim 10, wherein the programming system comprises a plurality of programmable registers.

12. The system of claim 11, wherein the plurality of programmable registers include:
    a quantity register for designating an encoder quantity;
    a position register for designating a relative encoder position;
    a processing register for designating a processing orientation;
    an overlap register for designating an overlap between image portions; and
    a size register for designating an image size.

13. The system of claim 9, wherein the encoders receive the image at a pixel clock rate of approximately 74.25 MHz.

14. The system of claim 9, wherein each of the encoders receives a same entire image from the HDTV video source.

15. The system of claim 9, wherein the encoders are MPEG-2 encoders.

16. A method for processing a High Definition Television (HDTV) image, comprising the steps of:
    providing a plurality of video encoders connected in parallel and directly attached to a HDTV video source; and programming each of the encoders to process only a portion of an entire image received from the HDTV video source wherein each of the encoders receives an entire image from the HDTV video source but processes only a portion thereof, based on the programming step.

17. The method of claim 16, wherein the programming step comprises:

designating an encoder quantity;

designating an encoder position;

designating a processing orientation;

designating an overlap between image portions; and designating an image size.

18. The method of claim 17, wherein the step of designating an image size comprises designating an image size of up to approximately 1125 lines per video frame.

19. The method of claim 16, wherein the receiving step comprises each of the encoders receiving the entire image from the HDTV video source at a pixel clock rate of approximately 74.25 MHz.

* * * * *